United States Patent [19]

Ross et al.

[11] Patent Number: 4,773,922
[45] Date of Patent: Sep. 27, 1988

[54] REMOTELY SERVICED FILTER AND HOUSING

[75] Inventors: Maurice J. Ross, Pocatello; Larry A. Zaladonis, Idaho Falls, both of Id.

[73] Assignee: The United States of America as represented by the United States Department of Energy, Washington, D.C.

[21] Appl. No.: 76,442
[22] Filed: Jul. 22, 1987
[51] Int. Cl.[4] ............................................. B01D 46/02
[52] U.S. Cl. ........................................ 55/481; 55/500; 55/493; 55/303; 55/DIG. 9
[58] Field of Search ...................... 55/96, 97, 429, 481, 55/493, 500, 503, 506, 508, 517, DIG. 9, 482, 357, 480, 490

[56] References Cited

U.S. PATENT DOCUMENTS

| | | | |
|---|---|---|---|
| 3,487,624 | 1/1970 | Tignanelli | 55/503 X |
| 4,372,853 | 2/1983 | Mayfield | 55/DIG. 9 |
| 4,426,211 | 1/1984 | Ataka et al. | 55/429 X |
| 4,450,964 | 5/1984 | Wood | 55/DIG. 9 |
| 4,608,062 | 8/1986 | Hughes | 55/481 X |
| 4,613,348 | 9/1986 | Natale | 55/508 X |
| 4,695,299 | 9/1987 | Spadaro et al. | 55/DIG. 9 |
| 4,701,196 | 10/1987 | Delany | 55/481 |

*Primary Examiner*—Charles Hart
*Attorney, Agent, or Firm*—James W. Weinberger; Thomas G. Anderson; Judson R. Hightower

[57] ABSTRACT

A filter system for a hot cell comprises a housing adapted for input of air or other gas to be filtered, flow of the air through a filter element, and exit of filtered air. The housing is tapered at the top to make it easy to insert a filter cartridge using an overhead crane. The filter cartridge holds the filter element while the air or other gas is passed through the filter element. Captive bolts in trunnion nuts are readily operated by electromechanical manipulators operating power wrenches to secure and release the filter cartridge. The filter cartridge is adapted to make it easy to change a filter element by using a master-slave manipulator at a shielded window station.

9 Claims, 4 Drawing Sheets

REMOTELY SERVICED FILTER AND HOUSING

CONTRACTUAL ORIGIN OF THE INVENTION

The United States has rights in this invention pursuant to Contract No. WINCO-203911 between the United States Department of Energy and Westinghouse Electric Company.

BACKGROUND OF THE INVENTION

This invention relates to filters for use in hot cells. In particular, it is an improved structure for supporting a HEPA (high-efficiency particulate air) filter for use in nuclear hot cells.

Hot cells are areas in which work is performed on equipment or substances that produce significant levels of radiation that may be threatening to humans. As a result, the work that is done is performed by electromechanical manipulators, master-slave manipulators, and overhead cranes, operated from remote locations by humans who are shielded from the radiation. Air in hot cells is circulated to prevent the buildup of radioactive materials. It is also necessary to be concerned about gases emanating from process equipment in hot cells. This is referred to as Vessel Off Gas (VOG). Such air or other gas is generally filtered to remove from the air or VOG particulate matter that may be radioactive. The filters and their housings are thus located in the hot cell, and are radioactive or contaminated with radioactive materials. As a result, it is necessary to be able to change filter cartridges in such filters with electromechanical manipulators. Filters that are presently used for filtering air that is supplied to hot cells receive filter cartridges on horizontal rails. Cranes place the filter cartridges containing filter elements on the rails and electromechanical manipulators slide the cartridges horizontally into place. The filter cartridges are then elevated by screws into engagement with knife edges that seal the filter cartridges against the escape of radioactive material into the air stream. The screws are operated by power wrenches that are controlled by electromechanical manipulators. The process of changing filter cartridges thus requires a substantial number of operations by electromechanical manipulators.

Electromechanical manipulators that are used in hot cells are expensive to purchase and difficult to maintain. The amount of maintenance that they need is roughly proportional to the amount of use that they get. In general, reliability is increased as the amount of use of electromechanical manipulators is reduced.

SUMMARY OF THE INVENTION

It is an object of the present invention to provide better filters for air or other gases exiting from hot cells.

It is a further object of the present invention to provide filter housings and filter cartridges for hot cells that require a minimum number of steps to insert and remove a filter cartridge.

It is a further object of the present invention to provide filter housings and filter cartridges for hot cells that require a minimal number of operations of an electromechanical manipulator to insert or remove a filter cartridge.

Other objects will become apparent in the course of a detailed description of the invention.

A filter system for a hot cell comprises a housing adapted for input of air or other gas to be filtered, flow of the air through a filter element, and exit of filtered air. The housing is tapered at the top to make it easy to insert a filter cartridge using an overhead crane. The filter cartridge holds the filter element while the air or other gas is passed through the filter element. Captive bolts in trunnion mounts are readily operated by electromechanical manipulators operating power wrenches to secure and release the filter cartridge. The filter cartridge is adapted to make it easy to change a filter element by using a master-slave manipulator at a shielded window station.

DETAILED DESCRIPTION OF THE INVENTION

Figure 1:
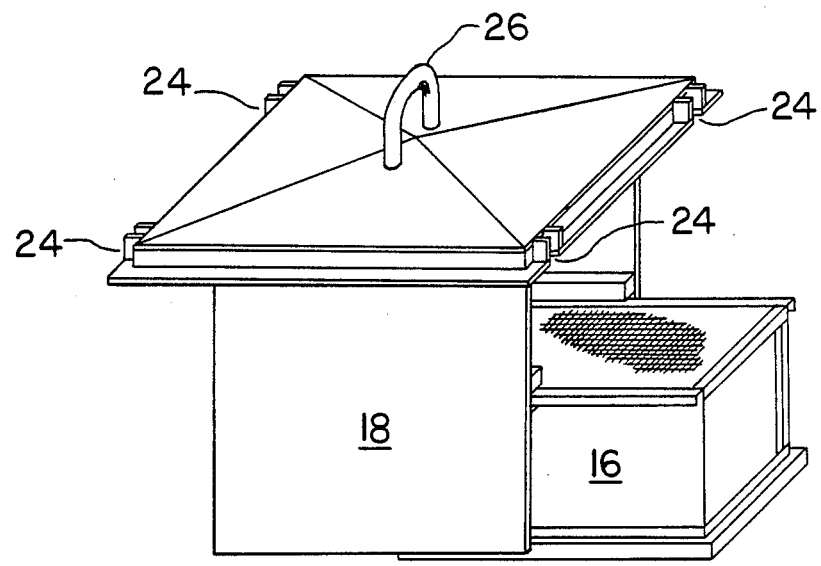
FIG. 1 is an exploded perspective view of the housing and cartridge of the present invention.
Figure 1:
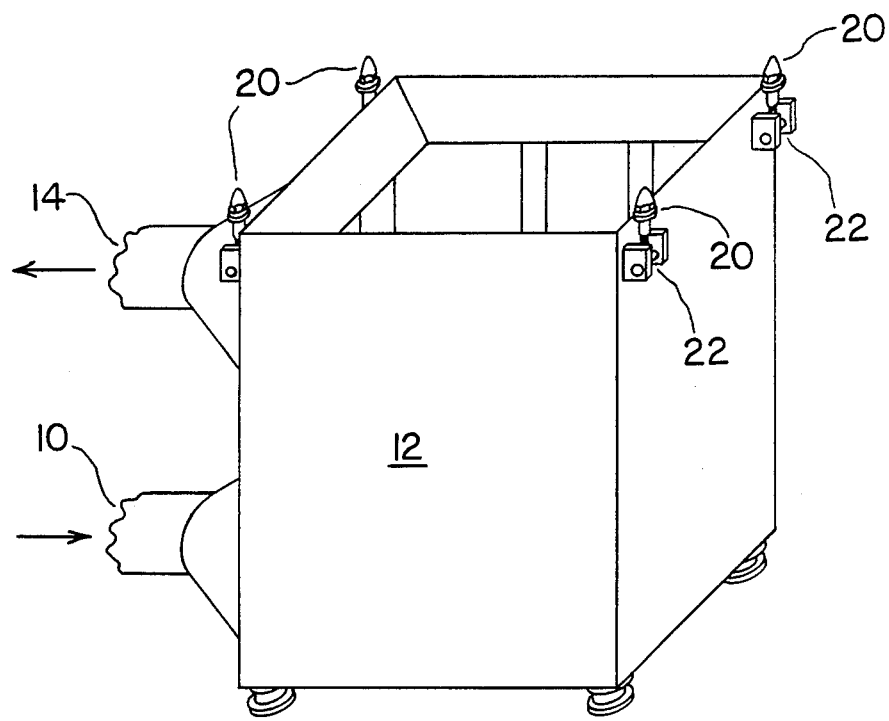

FIG. 1 is an exploded perspective view of the housing and cartridge of the present invention. In FIG. 1, an inlet gas line 10 is connected to a housing 12 to supply gas to be filtered. Filtered gas exits from the housing 12 through an exit gas line 14. Gas is filtered through a filter element 16, which is placed in a filter cartridge 18 and then lowered into the housing 12, where it is secured by a plurality of captive bolts 20. The captive bolts 20 are connected to the housing 12 by trunnion mounts 22, which allow the captive bolts 20 to swing to clear slots 24 in the filter cartridge 18. Filter cartridge 18 is equipped with a lifting bail 26, which can be engaged by the hook of a remotely-operated crane to lift filter cartridge 18 out of housing 12 or to insert filter cartridge 18 into housing 12.

Figure 3:
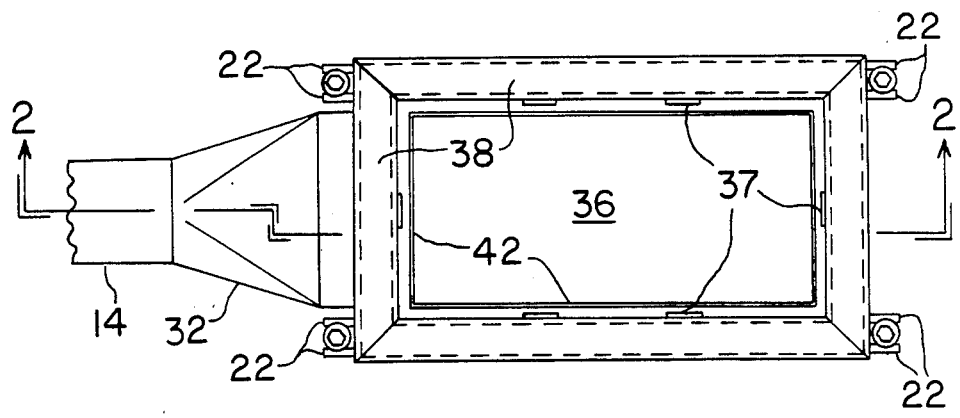
FIG. 3 is a plan view of the housing of FIG. 2.
Figure 2:
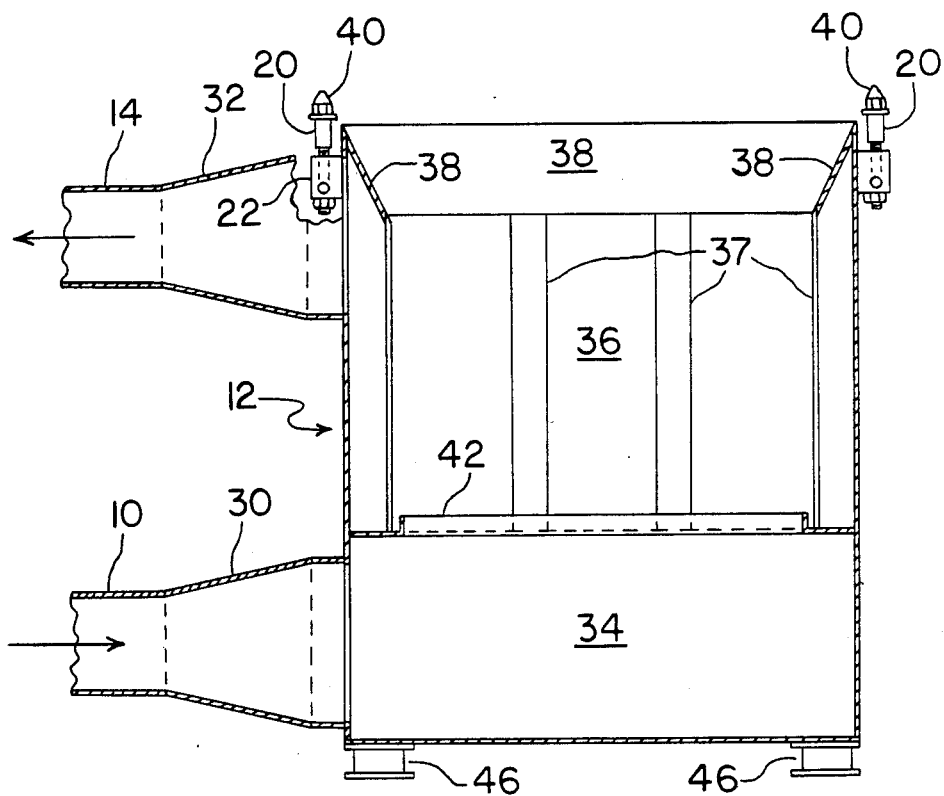
FIG. 2 is a front sectional view of the housing of the present invention.
Figure 6:
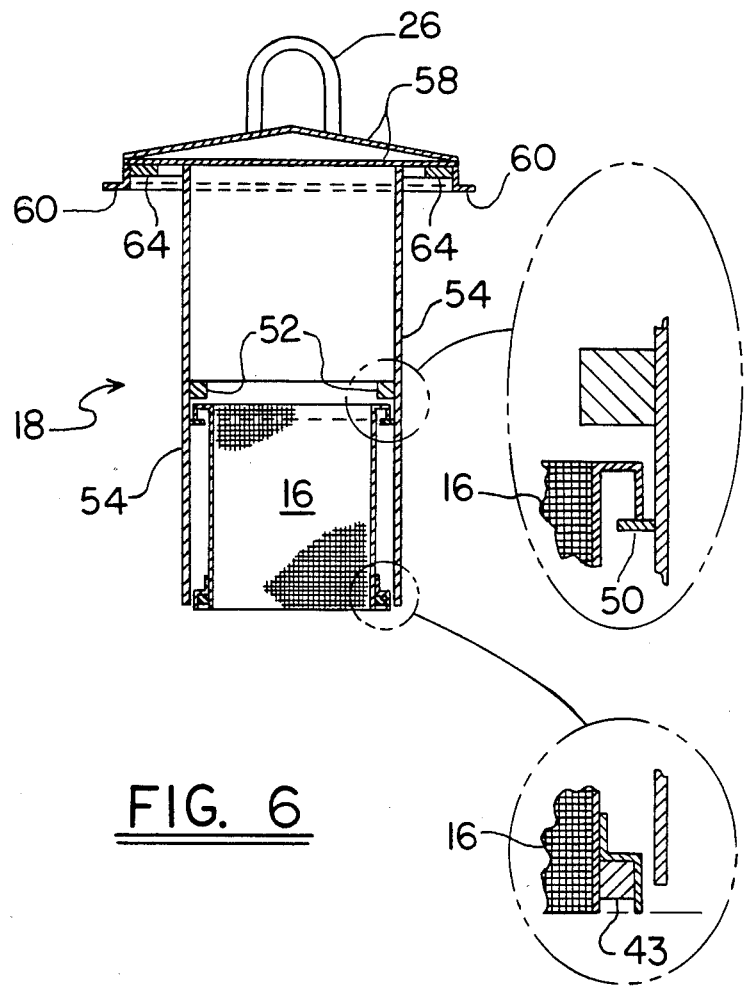
FIG. 6 is an end view of the cartridge of FIG. 4.

FIG. 2 is a sectional elevation view of the filter housing 12 of the present invention and FIG. 3 is a plan view of the housing 12. In FIGS. 2 and 3, the inlet gas line 10 is seen to have a tapered portion 30. This is a matter of design choice depending upon the relative pipe dimensions and flow rates. In the alternative, the inlet gas line 10 could enter the housing 12 without a change in dimensions. In any event, it is normally preferable to connect the inlet gas line 10 to the housing 12 at the bottom to permit the gas to be filtered to flow vertically through a filter element. In a similar fashion, the exit gas line 14 has a tapered portion 32. This too is a matter of design choice. The air or gas could be passed horizontally or at any angle through the filter element 16. Air flowing through the inlet gas line 10 and the tapered portion 30 of FIG. 2 enters a plenum chamber 34, then flows upward through a region 36 in which the filter element 16 will be placed guided by guide bars 37. A tapered surface 38, visible in section and also as a part of the plan view, will be seen to guide the insertion of a filter cartridge 18 so as to make it easier to operate using a remote manipulator or a crane. The captive bolts 20 are seen to have tapered heads 40. This facilitates the use of the powered wrench on an electromechanical manipulator. The trunnion mounts 22 permit the captive bolts 20 to swing to allow insertion of a filter cartridge 18. A knife edge 42 is designed to receive a filter cartridge 18 and make an air-tight seal with a seal 43, which is attached around the outer edge of the filter element 16 as a part of the filter element 16, as shown in FIG. 6. Feet 46 support the housing 12 on the floor or on any other convenient surface.

Figure 4:
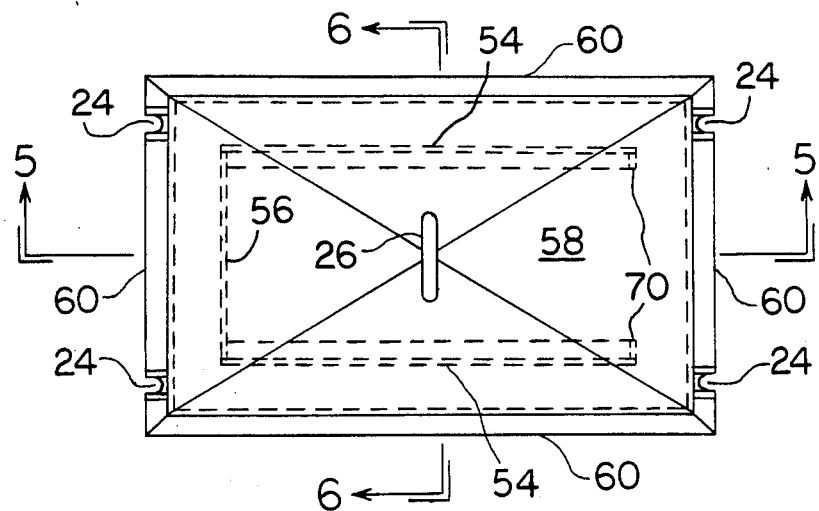
FIG. 4 is a plan view of a cartridge for insertion into the housing of FIG. 2.
Figure 5:
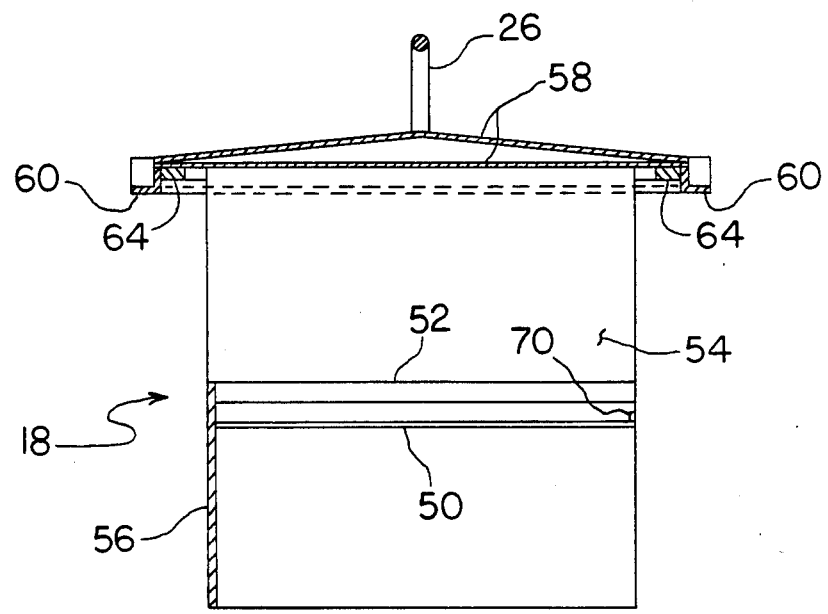
FIG. 5 is an elevation view of the cartridge of FIG. 4.

FIG. 4 is a plan view of a filter cartridge 18 for the practice of the present invention, FIG. 5 is an elevation of the filter cartridge 18, and FIG. 6 is an end view of the filter cartridge 18. In FIGS. 4, 5 and 6, the filter element 16 is seen in place in the filter cartridge 18. The filter element 16 is supported on a pair of ledges 50 and is pressed into engagement at the seal 43 with the knife edge 42 of FIGS. 2 and 3 by bars 52 of FIGS. 5 and 6 when the filter cartridge 18 is inserted into the housing 12. The filter cartridge 18 has side walls 54 that are connected to an end wall 56 to enclose the filter cartridge 18 on three sides. The side walls 54 are connected to a top piece 58, which in turn is connected to the lifting bail 26 which is used to pick up the filter cartridge 18. An angle brace 60 extends around the top piece 58 and includes slots 24, which engage the captive bolts 20 of FIG. 1 to hold the filter cartridge 18 firmly in place. A gasket 64 is placed on the underside of the top piece 58 to seal against the housing 12 and prevent the escape of gas.

It should be evident that the present invention can be practiced with variations in the structure shown. In particular, the side walls 54 and the end wall 56 of the filter cartridge 18 serve only to support the filter element 16 and protect it when it is inserted into the housing 12. The function of the side walls 54 and the end wall 56 is served equally as well by a cage structure of bar stock or the like that includes support for the ledges 50 and bars 52 to seal the filter element 16 on the knife edge 42.

The principal advantage of the present invention lies in the ease with which a filter cartridge can be changed. The process of changing a filter cartridge is as follows. An electromechanical manipulator obtains a wrench and uses the wrench to loosen and tip each of the captive bolts 20. It should be noted that, while four captive bolts 20 are shown here, the invention could be made to work equally as well with two or even on such captive bolt. After the four captive bolts 20 are loosened and tilted or allowed to drop to the side, a remotely-operated crane engages the lifting bail 26 to lift the filter cartridge 18 out of the housing 12. A second filter cartridge 18 containing a replacement filter 16 can then be inserted by use of the crane, and the electromechanical manipulator can then complete the installation by tilting the captive bolts 20 into line and tightening them. The filter element 16 in the filter cartridge 18 can be changed using a master-slave manipulator or an electromechanical manipulator. The filter element 16 will function if it is allowed to rest on the ledge 50. In an alternate embodiment of the invention, the ledge 50 is given a small vertical lip 70, which prevents unwanted horizontal movement of the filter element 16. In such a case, it is appropriate to size the filter cartridge 18 and the filter element 16 so that the filter element 16 hangs slightly below the side wall 54 and the end wall 56 when it is in place on the ledge 50 and behind the lip 70. Changing the filter element 16 thus is facilitated by setting the filter cartridge 18 down on a horizontal surface, which lifts the filter element 16 clear of the lip 70, allowing the filter element 16 to be slid out of the filter cartridge 18.

The filter housing and cartridge of the present invention is designed for use in areas experiencing nuclear radiation, and it is therefore preferably made of nuclear-grade materials such as Type 304 stainless steel. The filter cartridge 18 is preferably sized to accept standard nuclear-grade filters, which are typically 12"×24"×11½" or 24"×24"×11½". Cylindrical filter elements 16 are also available commercially. It is a matter of routine engineering to adapt the housing 12 and the filter cartridge 18 to hold a cylindrical cartridge. If other filter sizes become standard, it is a simple matter to vary the dimensions and shapes to accommodate these sizes. When an apparatus was built to practice the present invention, the side walls 54 and the end walls 56 were made of ten-gauge Type 304 stainless steel. The bars 52 were of 304 stainless steel, 1"×1"×24". The captive bolts 20 were ¾"-10 NC nitronic-60, with machined 11½" hex nuts. The guide bar 37 were made of Type 304 stainless steel. The knife edge 42 that sealed the filter element 16 was machined to a width of ⅛". It should be evident from FIG. 1 that filter housings for the practice of the present invention can readily be stacked side by side for service by remote manipulators.

The description of the present invention is intended to set forth the best mode known to the inventors for the practice of their invention. It should be taken as illustrative and not as limiting, and the scope of the invention should be limited only by the appended claims.

The embodiments of this invention in which as exclusive property or privilege is claimed are defined as follows:

1. An apparatus to be disposed in a hot cell for filtering particulate matter that may be radioactive from an unfiltered stream of air or vessel off-gas by passing the stream through a replaceable filter element, the apparatus comprising:
   a. a filter cartridge sized to hold the replaceable filter element, the filter cartridge including a lifting bail for lifting by a crane; and
   b. a housing disposed in the hot cell and connected to means for supplying the unfiltered stream and to means for removal of a filtered stream, the housing including means for remote vertical insertion of the cartridge into sealed engagement to pass the unfiltered stream through the replaceable filter element.

2. The apparatus of claim 1 wherein the filter cartridge comprises in addition a slot and wherein the housing further comprises a captive bolt on a trunnion mount that is adapted to engage the slot to secure the filter cartridge to the housing.

3. The apparatus of claim 2 wherein the means for remote vertical insertion of the filter cartridge into sealed engagement comprises in addition a gasket between the filter cartridge and the housing that is compressed when the filter cartridge is placed in the housing and the captive bolt is tightened.

4. The apparatus of claim 1 wherein the means for remote vertical insertion comprise in addition a vertical taper in dimensions to facilitate placement of the filter cartridge in the housing.

5. The apparatus of claim 1 wherein the housing comprises in addition a knife edge for sealing to the replaceable filter element.

6. An apparatus for filtering particulate matter that may be radioactive from an unfiltered stream of air or vessel off-gas by passing the stream through a replaceable filter element, the apparatus comprising:
   a. a tubular housing disposed in a hot cell;

b. a filter cartridge telescopically insertable into the tubular housing, the filter element insertable into the filter cartridge;

c. means for remote vertical insertion and removal of the filter cartridge into the tubular housing;

d. remotely operable means for servicing the filter cartridge within the tubular housing;

e. means for supplying an unfiltered stream of a fluid to the filter element within the tubular housing; and f. means for removing a filtered stream of the fluid from the tubular housing.

7. The apparatus of claim 6 wherein the tubular housing and filter cartridge are rectangular in horizontal cross-section.

8. The apparatus of claim 6 wherein the tubular housing and the filter cartridge are circular in cross-section.

9. The apparatus of claim 6 wherein the filter cartridge makes a seal with the tubular housing when inserted in the tubular housing.

* * * * *